United States Patent Office 3,045,666
Patented July 24, 1962

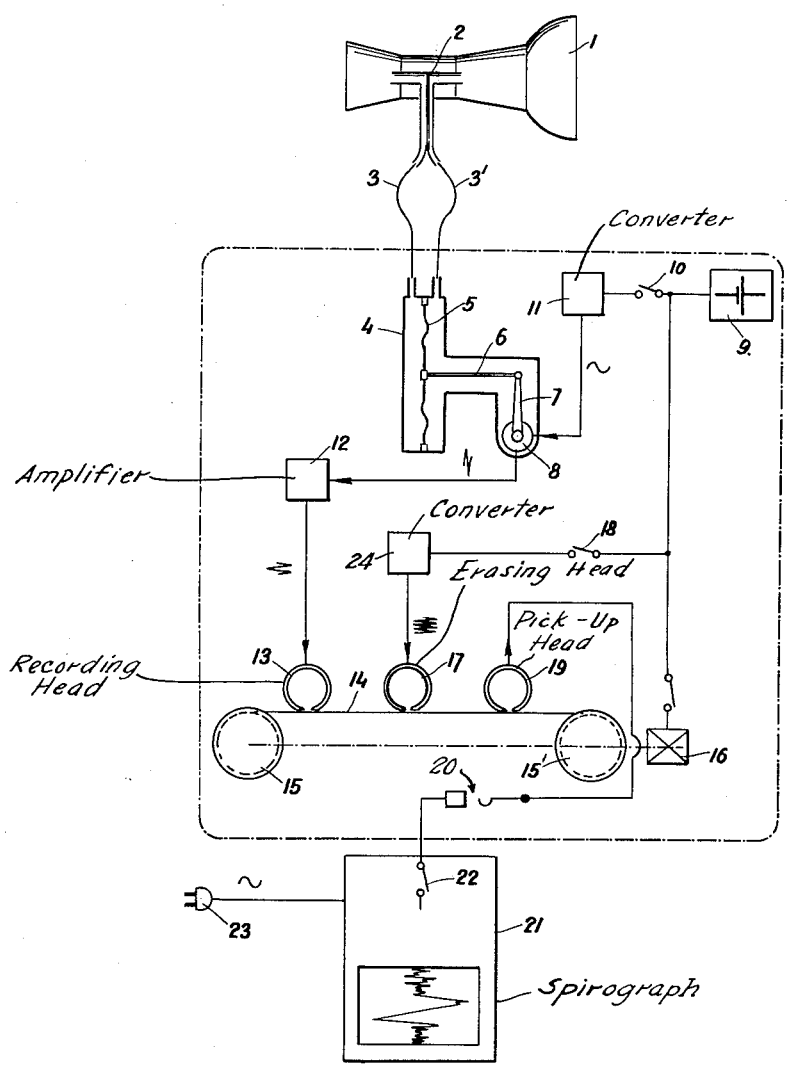

3,045,666
SPIROGRAPH
Bořivoj Dubský, Oldřich Straka, Hubert Felkel, and Rudolf Feuereisl, all of Prague, Czechoslovakia, assignors to Vyzkumny a zkusebni letecky ustav, Letnany, near Prague, Czechoslovakia
Filed Nov. 23, 1959, Ser. No. 854,963
Claims priority, application Czechoslovakia Nov. 24, 1958
3 Claims. (Cl. 128—2.08)

This invention relates generally to a device for recording data corresponding to the quantities of air inhaled and exhaled by a subject, and for providing a graphic record of such data.

Existing spirographs are not suitable for use in connection with moving subjects. Although the existing electromagnetic spirographs are of a portable weight and size, they are nevertheless too heavy to be conveniently applied to moving subjects without burdening the subject or otherwise interfering with the free movements of the latter.

Accordingly, it is an object of the present invention to provide a lightweight and compact device that can be easily carried by a work performing subject to provide a magnetic record or memory of impulses corresponding to the pulmonary capacity or respiratory functions of the subject.

In accordance with an aspect of this invention, impulses corresponding to the quantities of air inhaled and exhaled by a subject are recorded on a magnetic tape, wire or the like, so as to constitute a magnetic memory, and, at the conclusion of the test, such impulses are transmitted into an electromagnetic spirograph in which the recorded impulses are amplified, rooted and integrated in order to obtain a graphic record on a paper tape or the like of changes in the quantities of air that are inhaled and exhaled. The main advantage of the above arrangement resides in the substantial decrease in the size and weight of the device to be carried by the subject, so that spirograms may be recorded even with respect to moving subjects, for example, athletes, workers engaged in strenuous occupations, miners, animals and the like.

In accordance with another aspect of the invention, the magnetic recording produced by the portable device carried by the subject is converted into a graphic record by means of a conventional electromagnetic spirograph which is merely modified by the provision of a by-pass switch which serves to disconnect the sensing means, that is, the feeler actuated by differential pressures acting on diaphragms within the spirograph, and to connect, in place thereof, to the output of a pickup head of the magnetic recording device.

The above, and other objects, features and advantages of the invention, will be apparent in the following detailed description of an illustrative embodiment thereof which is to be read in connection with the accompanying drawing forming a part hereof, and wherein the single view is a wiring diagram of an embodiment of the invention.

Referring to the drawing in detail, it will be seen that the device embodying this invention includes a venturi tube 1 which, at one end, is adapted to fit in an airtight manner against the face of the subject. A pipe 2 extends into the throat of venturi tube 1 and has open end portions separated from each other at the middle of the pipe and opening, in opposite axial directions, within tube 1. Hoses 3 and 3' are connected between the opposite end portions of pipe 2 and the two compartments defined within a chamber 4 at the opposite sides of a diaphragm 5 extending across the chamber. The diaphragm 5 is connected, by means of a rod or link 6, to an arm which is rigidly connected to a conventional torsional magnetostrictive feeler 8. The excitation coil of feeler 8 is energized from a battery 9 through a switch 10 and a converter 11 which transforms or converts the direct current from battery 9 into an alternating exciting current.

The output voltage of feeler 8, which varies in accordance with the differential pressure between the opposite sides of diaphragm 5, is transmitted through an amplifier 12 to a recording head 13 of a magnetic recorder. The magnetic recorder further includes a magnetic recording tape 14 which is passed between reels 15 and 15' by means of a reversible electric motor 16 also driven from the battery source 9. The magnetic record on tape 14 may be erased by means of an erasing head 17 which is energized from the battery 9 through a circuit including a normally open switch 18 and a converter 24 so that the erasing head 17 is energized with the required alternating current from converter 24 only upon closing of switch 18.

The magnetic recorder further includes a pickup head 19 which is adapted to be connected through a separable coupling 20 to the input of a conventional electromagnetic spirograph 21 which is modified by the addition of a by-pass switch 22 which, upon being closed, disconnects the sensing means of the conventional spirograph 21 from the recording systems of the latter. Finally, the spirograph 21 is provided with the usual cable 23 by which it is electrically connected to suitable current supply lines.

The operation of the above described device for recording impulses corresponding to the quantities of air inhaled and exhaled by a subject is as follows:

The subject or patient inhales and exhales through the tube 1 so that differential pressures are sensed by the oppositely opening end portions of pipe 2, the sensed pressure differential being proportional to the velocity at which the air is inhaled or exhaled. The different pressures act, through hoses 3 and 3', in the related compartments at the opposite sides of diaphragm 5 within chamber 4, and thereby produce a force acting upon diaphragm 5 which is transmitted through link 6 to the arm 7, thereby tending to angularly displace the arm 7 and exert a corresponding torque or twisting moment on the torsional magnetostrictive feeler 8. Since the torque is directly proportional to the magnitude of the force acting on diaphragm 5, it is also proportional to the magnitude of the differential pressure at the opposite sides of diaphragm 5 and hence also to the velocity at which air is inhaled or exhaled through tube 1. The energization of the excitation coil of torsional feeler 8 with alternating current from converter 11 creates a rotating magnetic field in the torsional feeler which is deformed in response to the exertion of the torque thereon, and the deformation of the magnetic field induces an electromotive force or voltage in the pickup coil of the torsional feeler, which voltage is proportional to the value of the torque and therefore also to the velocity at which air is inhaled or exhaled through tube 1. The voltage induced in the pickup coil is transmitted through the amplifier 12 to the recording head 13 which records a corresponding magnetic impulse on the magnetic recording tape 14 moving at a uniform speed between the reels 15 and 15', with the magnitude of the magnetic impulse or signal recorded on the tape being proportional to the value of the voltage from the pickup coil and therefore also to the magnitude of the differential pressure acting on diaphragm 5.

Since the tape 14 moves at a uniform speed, the duration of the magnetic signal or impulse recorded on the tape represents the time factor, so that the magnitude and duration of the magnetic impulses correspond to the quantities of air inhaled and exhaled by the subject.

The mouthpiece or tube 1 and the components of the device enclosed within a broken line on the drawing form a lightweight, compact unit that can be conveniently mounted on the subject's body.

After the test is completed, the magnetic record of impulses on tape 14 is transmitted into the input of the electromagnetic spirograph 21 by way of the coupling 20 connected to the pickup head 19. During such transmission of the impulses on tape 14 into the spirograph 21, the switch 22 on the latter is positioned so as to disconnect the feeler or sensing means forming part of the spirograph and to connect instead to the output from the portable device which is separable from the spirograph at the coupling 20. The spirogram recorded on the magnetic tape 14 is transcribed in spirograph 21 so that the result is mathematically treated in the same way as during the normal operation of the conventional spirograph 21. Thus, the graphic record obtained by transcribing the impulses on magnetic tape 14 in spirograph 21 is fully equivalent to the record that would be obtained during normal operation of the spirograph 21 as the rooting and integration which are necessary in order to obtain indications of volume from values corresponding to the differential pressure proportional to the cube of velocity, are carried out by means of the same components in spirograph 21.

During the performance of the test and the production of a magnetic record on the tape or wire 14, the spirograph 21 is separated from the remainder of the apparatus at the separable coupling 20, and the apparatus carried by the subject consists only of the tube or mouthpiece 1 and those elements or components which appear within the broken line on the drawing, which carried apparatus may be constructed so as to be small in size and light in weight. Thus, the present invention substantially increases the possibility of testing with spirographs in medical and veterinary research, in astronautics, in athletics, and in various strenuous occupations to an extent not previously realizable. Further, medical examinations may be performed under entirely new conditions, thereby making it possible to attain highly significant data under conditions previously unattainable, which data is useful for various purposes in different technical and scientific fields.

Although an illustrative embodiment of this invention has been described in detail herein with reference to the accompanying drawing, it is to be understood that the invention is not limited to that precise embodiment, and that various changes and modifications may be effected therein without departing from the scope or spirit of the invention, except as defined in the appended claims.

What we claim is:

1. A device for recording data corresponding to the quantities of air inhaled and exhaled by a subject; comprising
   (A) an open ended tube through which the subject can inhale and exhale, and a pipe disposed in said tube and opening at its ends in opposite axial directions;
   (B) means defining a chamber having a diaphragm therein dividing said chamber into two compartments;
   (C) conduit means connecting said compartments to the opposite ends of said pipe so that a differential pressure acts on said diaphragm which is proportional to the velocity of air flow through said tube;
   (D) a torsional feeler having a torsional body in which a magnetic field is established so as to be deformed in response to a torsional stressing of the latter and a coil in which a voltage is induced in response to deformation of the magnetic field;
   (E) a battery powered source of alternating current connected to said feeler for energizing said magnetic field of the latter;
   (F) means connecting said diaphragm to said torsional body to torsionally stress the latter proportionately to the differential pressure acting on said diaphragm so that the magnitude of the voltage induced in said coil is proportional to the velocity of air flow through said tube; and
   (G) a magnetic recorder including
      (1) a recording head,
      (2) means connecting said head to said coil for excitation by said induced voltage,
      (3) means energized by said battery for driving a magnetizable recording element past said head at a uniform speed so that a magnetic record is impressed on said element which is a function of the quantities of air inhaled and exhaled by the subject, and
      (4) a pick-up head disposed adjacent the path of said element and adapted to be energized by said magnetic record during play-back of the latter to provide a corresponding output signal.

2. In an apparatus for providing a graphic recording of the quantities of air inhaled and exhaled by a subject, the combination of:
   (A) a portable device adapted to be conveniently carried by the subject and comprising
      (1) an open ended tube through which the subject can inhale and exhale with a pipe disposed in said tube and opening at its ends in opposite axial directions,
      (2) means defining a chamber having a diaphragm therein dividing said chamber into two compartments with conduit means connecting said compartments to the opposite ends of said pipe so that a differential pressure acts on said diaphragm which is proportional to the velocity of air flow through said tube,
      (3) a torsional feeler having a torsional body in which a magnetic field is established so as to be deformed in response to torsional stressing of the latter and a coil in which a voltage is induced in response to deformation of the magnetic field,
      (4) a battery powered source of alternating current connected to said feeler for energizing said magnetic field of the latter,
      (5) means connecting said diaphragm to said torsional body to torsionally stress the latter proportionately to the differential pressure acting on said diaphragm so that the magnitude of the voltage induced in said coil is proportional to the velocity of air flow through said tube, and
      (6) a magnetic recorder including a recording head, means connecting said head to said coil for excitation by said induced voltage, means energized by said battery for driving a magnetizable recording element past said head at a uniform speed so that a magnetic record is impressed on said element which is a function of the quantities of air breathed in and out by the subject, and a pick-up head disposed adjacent the path of said element and adapted to be energized by said magnetic record during play-back of the latter to provide a corresponding output signal;
(B) an electromagnetic spirograph having an input; and
(C) separable coupling means for connecting said output of the portable device to said input of the spirograph during play-back of the magnetic record so that the spirograph is actuated by the latter to produce a corresponding graphic record representing the quantities of air breathed in and out by the subject.

3. In an apparatus for providing a graphic recording of the quantities of air breathed in and out by a subject, the combination as in claim 2; wherein said magnetic recorder further includes an erasing head selectively energizable from said battery to erase the magnetic record from said element after said magnetic record has been translated into a graphic record by said spirograph.

References Cited in the file of this patent

UNITED STATES PATENTS

| | | |
|---|---|---|
| 2,228,983 | Bloomheart | Jan. 14, 1941 |
| 2,427,145 | Koehler et al. | Sept. 9, 1947 |

FOREIGN PATENTS

| | | |
|---|---|---|
| 546,014 | Italy | July 11, 1956 |